United States Patent

[11] 3,631,248

[72] Inventor Ralph B. Johnson
 Dallas, Tex.
[21] Appl. No. 889,145
[22] Filed Dec. 30, 1969
[45] Patented Dec. 28, 1971
[73] Assignee Texas Instruments Incorporated
 Dallas, Tex.

[54] TARGET-SCANNING CAMERA COMPRISING A CONSTANT TEMPERATURE SOURCE FOR PROVIDING A CALIBRATION SIGNAL
 5 Claims, 8 Drawing Figs.

[52] U.S. Cl..................................................... 250/83.3 H,
 178/6.8, 178/7.6, 250/83.3 HP, 250/236, 350/7, 350/200
[51] Int. Cl....................................................G02b 17/00,
 H04n 3/00
[50] Field of Search........................................... 250/83.3 H,
 236, 83.3 HP; 350/7, 200; 178/7.6, 6.8

[56] References Cited
 UNITED STATES PATENTS
2,534,543 12/1950 Bullock .......................... 350/200 X
2,914,608 11/1959 Blackstone .................... 178/7.6 X
2,981,842 4/1961 Kaufold et al. ................ 250/83.3
3,034,398 5/1962 Barnes et al. .................. 250/83.3 X
3,087,986 4/1963 De Brosse...................... 250/83.3 X
3,371,212 2/1968 Weiss ............................. 250/83.3
3,372,230 3/1968 Wurz............................... 250/236 X
 FOREIGN PATENTS
 650,497 9/1928 France ........................... 178/7.6

Primary Examiner—James W. Lawrence
Assistant Examiner—T. N. Grisby
Attorneys—Samuel M. Mims, Jr., James O. Dixon, Andrew M. Hassell, Harold Levine and Richards, Harris & Hubbard ABSTRACT: To scan a target area, a polygon-shaped scan mirror is mounted to rotate about one axis and oscillate about an axis orthogonal thereto. Oscillation about the second orthogonal axis is tailored to a desired motion by means of an eccentric cam. Radiation incident on the rotating and oscillating scan mirror is reflected to a radiant energy detector by means of a convergent mirror. The convergent mirror is track-mounted and adjustable to vary the focal range focal range for scanned areas at different locations. A constant temperature area is scanned to produce a meaningful output signal prior to each scan cycle.

PATENTED DEC 28 1971
3,631,248
SHEET 1 OF 4
FIG. 1
FIG. 2
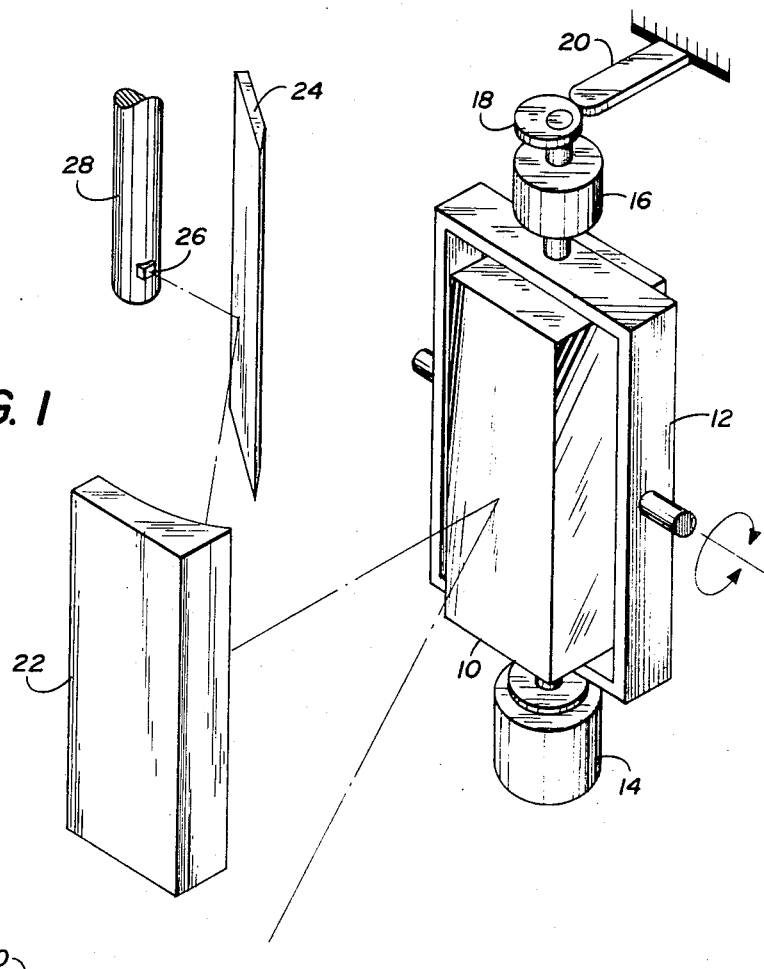
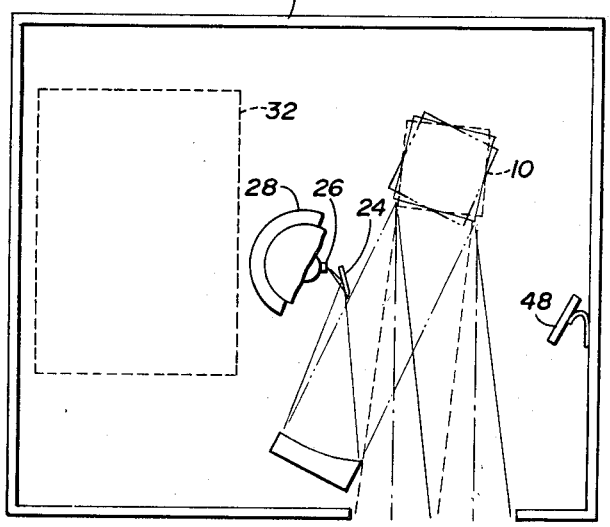
INVENTOR.
RALPH B. JOHNSON

INVENTOR
RALPH B. JOHNSON

INVENTOR:
RALPH B. JOHNSON

TARGET-SCANNING CAMERA COMPRISING A CONSTANT TEMPERATURE SOURCE FOR PROVIDING A CALIBRATION SIGNAL

This invention relates to a scanning camera, and more particularly to a scanning camera having a variable focal range with a single scanning mirror.

Heretofore, scanning cameras of the type to which the present invention relates incorporated separate horizontal and vertical scanning mirrors. The horizontal scanning mirror was a regular polygon mounted to rotate at a low, constant angular rate to generate horizontal scanning of the target area. The vertical scanning mirror was a plane surface mounted to oscillate at a high, constant angular rate to generate the vertical sweep to produce a raster in object space. Radiant energy incident on the horizontal scanning mirror is reflected to the vertical scanning mirror and again reflected to a fixed converging mirror. The converging mirror receives the radiant energy and concentrates it on an infrared detector. The detector converts the received radiation into an electrical signal which is processed by video signal circuitry. As an alternate, the scanning mirrors are interchanged with the result that the scanning mirror is rotated 90°.

Since the size of both scan mirrors of the prior systems are fairly large for practical applications, the two scan mirrors must be separated by an appreciable distance. Also, the object distance, that is, the focal range of the camera, is generally restricted to less than 10 feet. The focal range of a camera is, in effect, the ability of the optical system to encompass a large set of conjugate points. An optical system with a wide range can therefore focus on not only very distant, but also on near objects by an adjustment of the optical system. The depth of focus of a camera, on the other hand, is the amount of latitude an optical system has when focused at a particular distance.

An object of the present invention is to provide a scanning camera with a single scanning mirror. A further object of this invention is to provide a scanning camera having a variable focal range. Another object of this invention is to provide a scanning camera having a scanning mirror mounted for rotation about two orthogonal axes. A still further object of this invention is to provide a scanning camera with an adjustably positioned convergent reflecting surface. Still another object of this invention is to provide a scanning camera with a polygon-shaped scanning mirror mounted for movement to scan both in a horizontal and vertical direction.

In accordance with this invention, a scanning radiant includes a radiant energy reflecting surface mounted for rotation about two orthogonal axes. A motor coupled to one of the mounting axes imparts rotation motion to the reflecting surface at a constant angular velocity. Vertical scanning of a target area is accomplished by oscillating the reflecting surface about the second mounting axis. Oscillation about the second mounting axis may be accomplished by means of a rotating cam. Radiant energy incident on the reflecting surface is reflected to an optical system that includes a detector producing an output signal that varies with the radiant energy incident thereon.

In accordance with a more specific embodiment of the invention, a scanning camera includes a polygon-shaped structure having reflecting surfaces attached to each side and mounted for rotation about two orthogonal axes. Movement of the polygon-shaped structure about the two axes is provided to apply a rotational motion about the longitudinal axis and an oscillating motion about a perpendicular transverse axis. Radiant energy reflected from the surfaces of the polygon is incident on a converging mirror that is adjustably mounted. The converging mirror directs the radiant energy to a detector that produces an output signal that varies with the radiant energy incident thereon. Adjustment of the converging mirror provides a focal range adjustment.

A more complete understanding of the invention and its advantages will be apparent from the specification and claims and from the accompanying drawings illustrative of the invention.

Referring to the drawings:

FIG. 1 is a schematic of an optical scanning system in accordance with the present invention;

FIG. 2 illustrates the scanning pattern generated by rotating a scanning mirror about a longitudinal axis;

Figure 5:
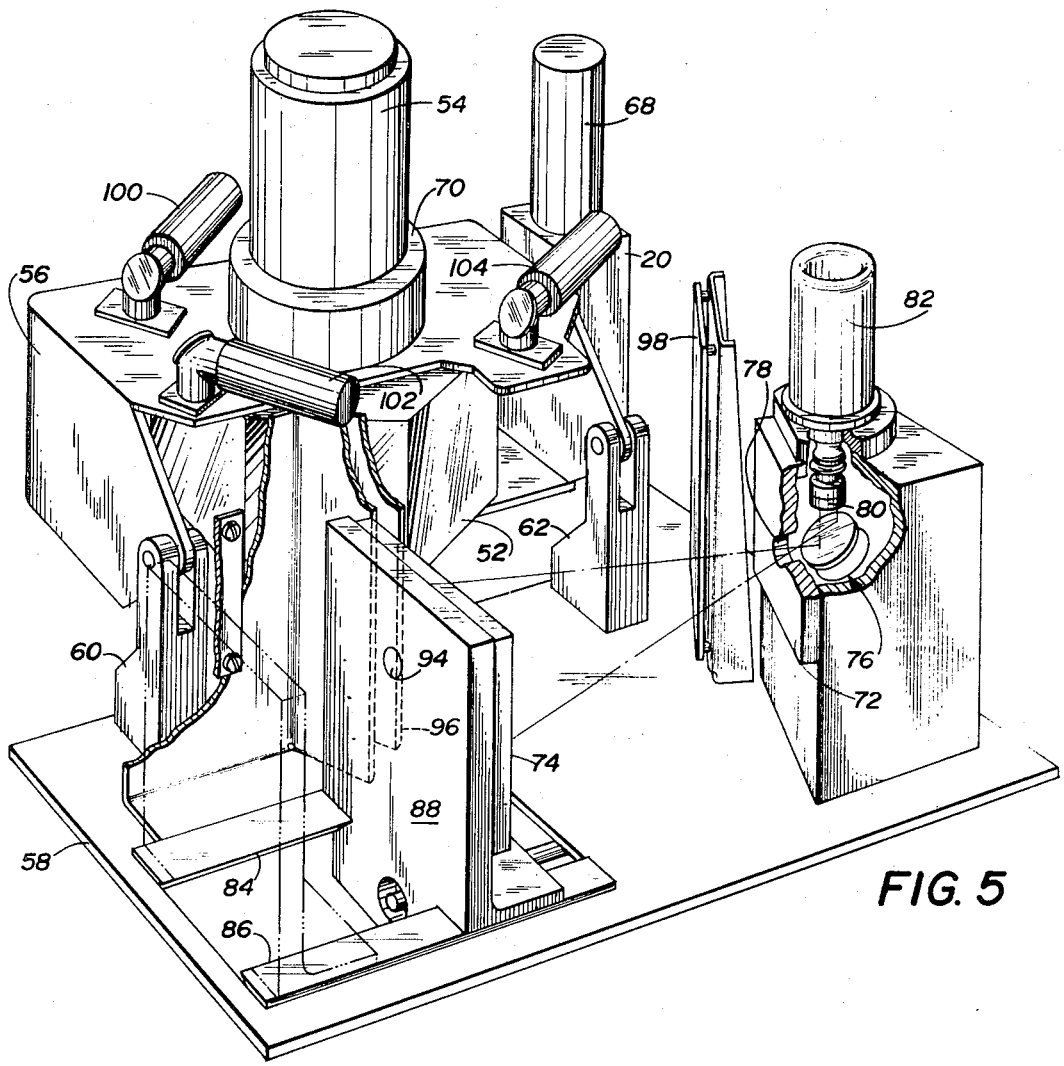
FIG. 5 is a perspective view of a scanning camera employing a hexagon-shaped reflecting surface.

Referring to FIG. 1, there is shown the basic components of a scanning camera that generates a raster scan pattern of a target area. Radiant energy from the target area impinges on a scanning mirror 10 that is illustrated as a four-sided, regular, polygon with mirrored surfaces on each side. The scanning mirror 10 is mounted to rotate about a longitudinal axis (the $x$-axis) within a mounting frame 12 by means of a motor 14. Rotating the mirror 10 about the $x$-axis causes a target area to be scanned in a horizontal direction. Vertical scanning of the target area is accomplished by rotating the mounting frame 12 about a $y$-axis that is perpendicular to the $x$-axis. To rotate the scan mirror about the $y$-axis, a speed reducer 16, coupled to the output shaft of the motor 14, imparts a slowly rotating motion to an eccentric cam 18. The cam 18 engages a cam follower 20 thereby causing the mounting frame to be oscillated about the $y$-axis. Oscillating the frame 12 about the $y$-axis causes the scan mirror 10 to vertically sweep a target area.

Radiation incident on the scan mirror 10 as it rotates about its two orthogonal axes is reflected therefrom to a primary mirror 22. Primary mirror 22 is a convergent mirror that concentrates radiation received from the scan mirror 10 into a beam directed to a folding mirror 24. Radiation from a target area is, therefore, reflected by the scan mirror 10 onto the primary mirror 22 which converges the radiation onto the folding mirror 24 and from there focuses the radiation upon a detector 26. Detector 26 may be of the type responsive to radiation in the infrared or visible region and generates electrical signals related to the radiant energy incident onto the scan mirror 10.

The proper operating temperature for the detector 26 is maintained by mounting the detector to the cold finger of a Dewar 28. When using a mercury-cadmium-telluride detector (such a detector is preferred in the $8\mu$ to $14\mu$ region), the Dewar 28 is filled with a liquid nitrogen coolant to maintain the temperature at the proper level.

Figure 3:
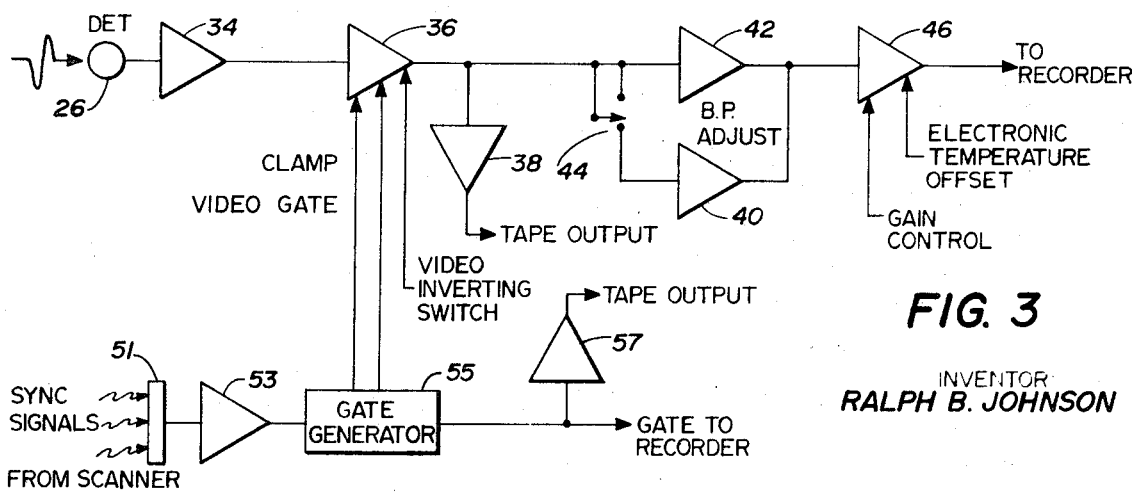
FIG. 3 is a block diagram of a system for processing a detector signal into a video display.

Referring to FIG. 2, there is shown a plan view of a scanning camera within a housing 30. Radiation entering the housing 30 follows a path that includes the scan mirror 10, the primary mirror 22, the folding mirror 24, and the detector 26 mounted to the Dewar 28. Electrical responses of the detector 26 are coupled to the input of a video electronic circuit 32, a block diagram of which is given in FIG. 3.

Radiant energy reaching the detector 26 modulates the conductance of the detector causing analog electrical signals to be applied to a preamplifier 34. The preamplifier 34 amplifies the detector signal to a level suitable for precessing. From the preamplifier 34, the signal is applied to the level control amplifier 36 where it is gated to remove unwanted information. At the output of the level control amplifier 36, an emitter-follower buffer amplifier 38 is provided for external tape recording, where required. In the amplifier 36, a continuous gain control is offered and an offset level introduced. Following the level control amplifier 36, the video signal from the detector 26 is applied optionally to an inverting linear amplifier 40 and a noninverting linear amplifier 42. The output signal from these amplifiers is selected by use of a panel switch 44 to have a BLACK hot target or a WHITE hot target display on a CRT display. A driver amplifier 46 connects to the two amplifiers and has a processed video signal output for connecting to a recorder (not shown).

In order to record meaningful data, the video signal output of the level control amplifier 36 should be amplified about a constant temperature reference. Prior to each active scan of the scanning mirror 10, the detector 26 sees a constant temperature heater pad 48 (referring to FIG. 2) mounted to the scanner housing 30. Accordingly, prior to each active scan of a target area, the scan mirror 10 receives a fixed level of radiant energy from the heater 48 which is reflected by means of the primary mirror 22 to the detector 26. This sets the level control amplifier 36 at the beginning of each scan. The "cold spike" generated when the detector 26 sees itself will be blanked from the level control amplifier 36 so that it will not upset the temperature reference.

Figure 4:
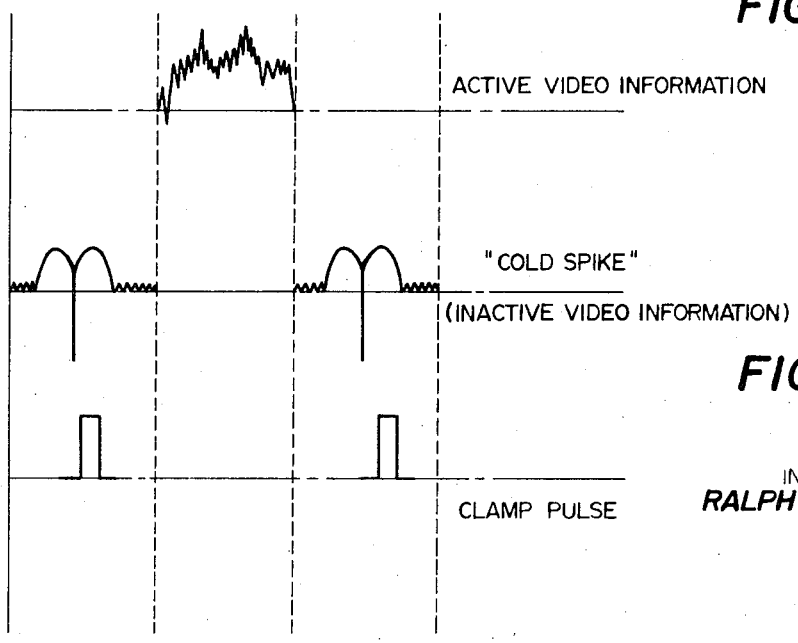
FIG. 4 shows video, calibration and gate waveforms of the system of FIG. 3.

Referring to FIG. 4, there is shown waveforms for describing the relationship of the reference level setting and the active scan time. Only during the active scan period between the clamping pulses 50 will the radiation incident on the scan mirror 10 produce a video output signal. Generation of the clamping pulses 50 is synchronized with the rotation of the scan mirror 10 about its longitudinal axis by means of a sync scanner 51 coupled to the input of a sync amplifier 53. An output signal from the sync amplifier 53 is tied to a gate generator 55 having outputs to the level control amplifier 36, a buffer amplifier 57 and the video signal recorder. The buffer amplifier 57 is optional and used only when tape recording is required.

In operation, the scan mirror 10 rotates about the x-axis to generate horizontal scans of a target area and is simultaneously rotated about the y-axis to generate a vertical sweep. The two axes rotation of the scan mirror 10 therefore generates a complete raster scan of the target area. Prior to the start of each horizontal scan, the electronics circuit 32 is calibrated by directing radiation from the heater pad 48 to the detector 26 by means of the scan mirror 10. Upon completion of this reference level setting, the active scan area commences and radiant energy entering the housing 30 and impinging on the scan mirror 10 is reflected by means of the primary mirror 22 and the folding mirror 24 to the detector 26.

During this active scan area, the scan mirror 10 is rotated at high, constant angular rate about its longitudinal axis. At the same time, it completes one-half the oscillating cycle from one end position to the other by means of the eccentric cam 18. After the scan mirror 10 has been rotated about the y-axis from one end position to the other, the active scan area ends and the video output of the circuit 32 is cut off. During this dead time, the cam 18 returns the scan mirror 10 to the starting position. This cycle is continuously repeated to produce a video display of the radiant energy from the target area. Where an infrared detector 26 is employed, the video display will be a temperature profile of the target area.

Figure 7:
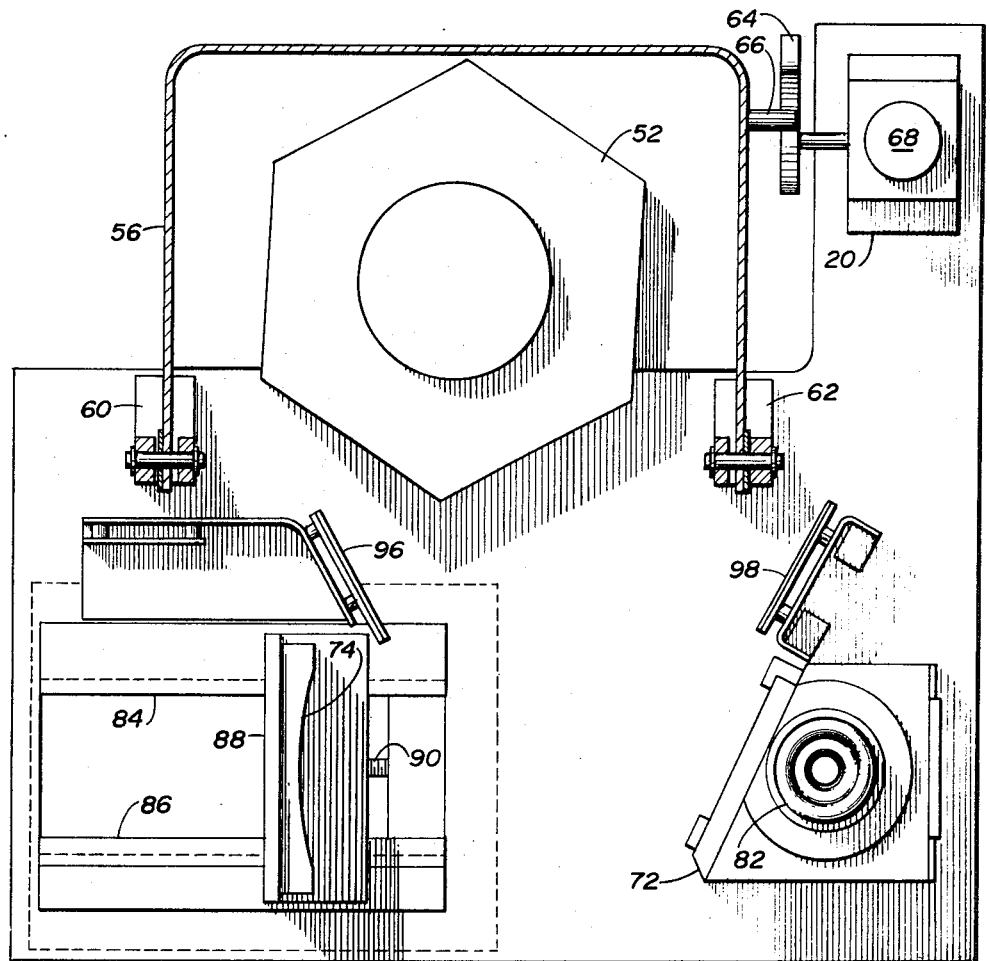
FIG. 7 is a plan view of the camera of FIG. 5.
Figure 6:
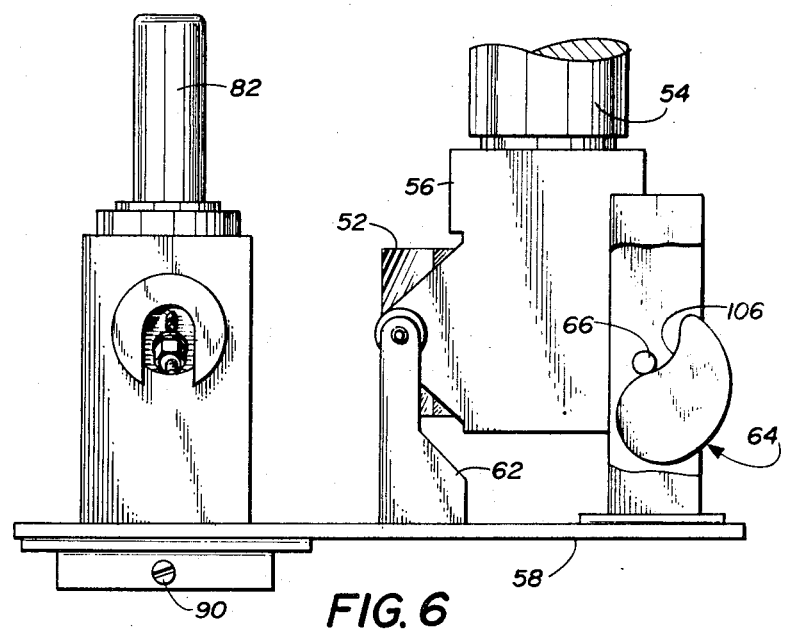
FIG. 6 is a side view, partially cutaway, of the camera of FIG. 5 emphasizing the oscillating mechanism.

Referring to FIGS. 5 through 7, there is shown an embodiment of the present invention using a six-sided reflecting structure. A six-sided polygon having radiant energy reflecting surfaces on each side comprises a scan mirror 52. Rotation of the scan mirror 52 about a longitudinal axis is provided by means of a motor 54 mounted to the top plate of a housing 56. The housing 56 is pivotally mounted with respect to a base plate 58 by means of upright supports 60 and 62. Pivotally supporting the housing 56 by means of the uprights 60 and 62, in conjunction with a rotating cam 64 and a cam follower 66, imparts an oscillating motion to the scan mirror 52 for vertical scanning of a target area. The cam 64 is rotated at a low, constant angular rate by means of a motor 68 through a gear train 70. Thus, in the present embodiment, the motor 54 provides rotation of the scan mirror 52 for horizontal scanning and the motor 68 rotates the cam 64 to provide vertical scanning of a target area.

Radiant energy incident on the scan mirror 52 is reflected to a folding mirror 72 and further reflected to a primary mirror 74. Primary mirror 74 converges the energy from the folding mirror 72 through an aperture 78 in the folding mirror to a primary focal point. From the primary focal point, the radiation diverges and is further reflected by a reflector 76. From the reflector 76, radiant energy is focused on an infrared detector 108, referring to FIG. 8, by means of an optical system 80. To maintain the detector at a proper operating temperature it is attached to the cold finger of a Dewar 82 filled with liquid nitrogen.

An important feature of the scanning camera of FIG. 5 is the adjustable positioning of the primary mirror 74. The primary mirror 74 is mounted on V-shaped tracks 84 and 86 by means of a support fixture 88. An adjusting screw 90, having a threaded section, positions the fixture 88 along the tracks 84 and 86. An adjustment nut 92 is threaded onto the adjusting screw 90 and mates with the fixture 88.

By adjusting the position of the primary mirror 74, the optical scanning points of the scanning camera are varied. In the position illustrated in FIG. 5, the camera will focus on an object plane relatively close to the camera housing. In the phantom position, the object plane of conjugate points becomes infinite.

To provide a temperature reference for the detector 108, two constant temperature sources 96 and 98 are provided. As explained, calibration of the detector 108 is carried out once for each horizontal scan. When the scan mirror 52 is properly positioned with respect to the sources 96 and 98 during each horizontal scan, the aperture of the primary mirror is completely filled by radiation from the sources 96 and 98. Radiation emitted by the sources 96 and 98 is focused upon the detector 108. The signal from the detector 108 during this position of the mirror 52 is the reference level for calibration. The sources 96 and 98 are maintained at the desired temperature by means of a heater connected to a source of electrical energy in a conventional manner.

Synchronization of the operation of the scan mirror 52 during both the calibrating cycle and the scan cycle is controlled by position synchronizers 100, 102 and 104 mounted to the top plate of the housing 56. Each synchronizer includes a high-responsive device, a light source, and appropriate optics for focusing on the scan mirror 52 as it rotates about its longitudinal axis. Each of the synchronizers 100, 102 and 104 provides an electrical output signal to the video circuit for proper timing of the operation thereof.

As explained previously, the cam 64 in conjunction with the cam follower 66 imparts an oscillating motion to the scan mirror 52 for vertical scanning of a target area. In the position shown in FIG. 6, the scan mirror 52 is in a starting position, that is, at one end of the scanning motion. As the cam 64 rotates clockwise, the housing 56 is pivoted counterclockwise about the uprights 60 and 62 causing the scan mirror 52 to be slowly oscillated, at a constant angular rate, to a second end position. Cam 64 will rotate approximately 324° during the frame time. During the last 36° rotation of the cam 64, the housing 56 will be returned to the starting position. This return positioning of the scan mirror 52 is controlled by the profile 106 of the cam 64.

In operation, the system of FIG. 5 is basically that as described earlier. The constant temperature sources 96 and 98 provide a means of calibrating the electronic circuitry connected to monitor the modulation of the detector conductance. Timing signals for synchronizing the operation of the scan mirror 52 are provided by means of the position synchronizers 100, 102 and 104. After the camera has been put into operation, an operator adjusts the position of the fixture 88, depending on the location of the target area with respect to the primary mirror 74. During the scanning cycle of the camera, a video presentation of the radiant energy of the target area is presented. When using an infrared detector such as mercury-cadmium-telluride, the video display is a temperature profile of the target.

Figure 8:
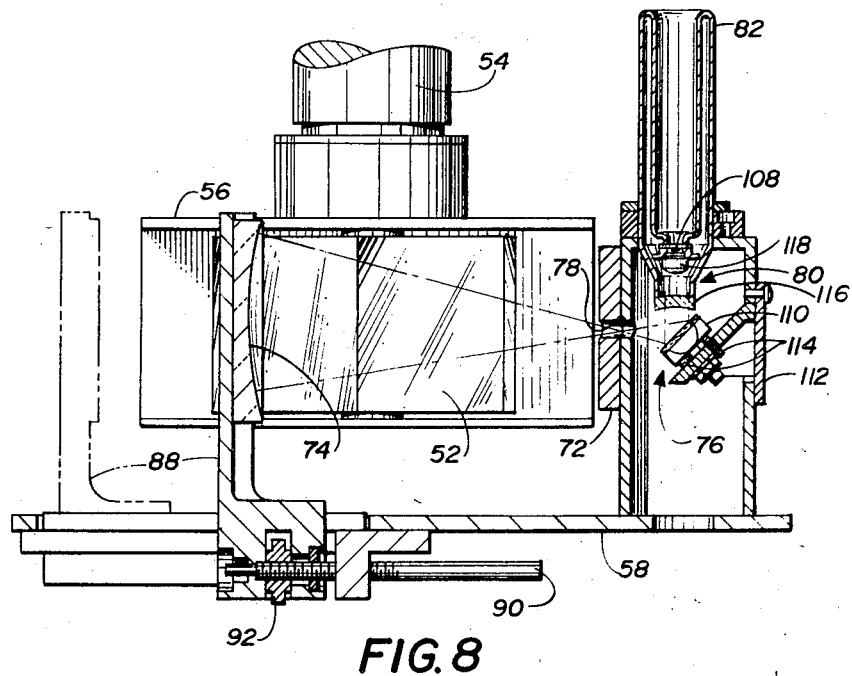
FIG. 8 is a sectional view taken along the line 8—8 of FIG. 7.

Referring to FIG. 8, there is shown in detail the reflector 76 and the optical system 80 for focusing radiant energy on a detector 108 mounted to the cold finger of the Dewar 82. The reflector 76 is mounted on a pivot 110 and supported by a bracket 112. Three setscrews 114 threaded through the bracket 112 and attached to the pivot 110 rotates the reflector 76 to direct radiant energy to the optical system 80 from the primary mirror 74. The optical system 80 includes a lens 116 and a lens 118 for focusing energy on the detector 108.

Of importance in the scanning camera of FIG. 5 is the optics arrangement including the primary mirror 74, and the lenses 116 and 118. By properly positioning these components and utilizing a preferred configuration, the field of view of the scanning camera is unobscured over the active area. As explained previously, the primary mirror 74 converges radiation from the scan mirror 52 to a primary focal point at the folding mirror 72. This focal point is transferred to the detector 108 by the lenses 116 and 118. Due to the convergence and focusing of the radiant energy by mirror 74 at approximately the aperture 78, the size of aperture 78 is minimized thereby resulting in minimal loss of radiant energy. In effect, the lenses 116 and 118 relay the primary focal point to the detector 108 for maximum signal response therefrom.

The parameters of an optical system for a scanner of the type illustrated are given in table I below. The values are based on the condition that the lens 118 is maintained at a temperature of 77° K. The distance between the lenses 116 and 118 is on the order of 0.361 inch with a black focal length of 0.1498 inch. Separation between the primary mirror 74 and the lens 118, including the distance to and from the reflector 76, is on the order of 10.371 inches.

TABLE I

| Optical system element | Type | Radius (inches) | Conic constant | Thickness (inches) | Material |
|---|---|---|---|---|---|
| Primary mirror 74 | Hyperbolic mirror | −17.1214 | −1.4953 | | Pyrex. |
| Lens 116 | Spherical | [1] 4.5649 [2] 1.8561 | | 0.2070 | Germanium. |
| Lens 118 | do | [1] −0.4711 −0.1729 | | 0.420 | Do. |

[1] Radius of the lens side facing the folding mirror 72.
[2] Radius of the lens side away from the folding mirror 72.

An optical system in a scanning camera having the parameters given above has been shown to have a field of view greater than 0.5° with better than 0.75 milliradians resolution. The focal range is from 2.3 feet to infinity, with focusing accomplished by varying the position of the primary mirror 74, that is, changing the distance between the primary mirror and the lens 116. The back focal length, however, remains constant. The effective focal ratio ($f$) of the system is 1.1 and the focal length is 4 inches.

Although only mercury-cadium-telluride detectors have been discussed with reference to the cameras of FIGS. 1 and 5, other semiconductor detectors such as Hg:Ge or pyroelectric detectors may be used. The sensitivity of the HgCeTe detector for wavelengths from 8 to 12 microns is slightly better than the mercury germanium detector. For some applications, however, there may be advantages to using the Hg:Ge detector.

In addition four- and Six-sided regular polygons, the scanning mirror may be constructed in the shape of other regular polygons. For example, an eight-sided structure could be provided for the scan mirror. The overall size of the camera will, however, be increased significantly.

While only preferred embodiments of the invention, together with modifications thereof, have been described in detail herein and shown in the accompanying drawings, it will be evident that various further modifications are possible without departing from the scope of the invention.

What is claimed is:

1. A scanning camera, comprising:
   a polygon-shaped supporting structure supporting mirrored surfaces on the sides thereof mounted for rotation about two orthogonal axes,
   a motor for rotating said supporting structure about one of said orthogonal axes,
   cam means for imparting a tailored motion to said supporting structure about the second orthogonal axis,
   a detector responsive to the radiant energy incident on at least one of said mirrored surfaces and producing an output signal that varies with the radiant energy incident thereon,
   convergent mirror means positioned to receive radiant energy from at least one of said mirrored surfaces and direct it to said detector,
   an optical system, including two spherical lenses, interposed between said convergent mirror means and said detector means for focusing the incident radiant energy on said detector,
   means for adjusting the position of said convergent mirror means to vary the focusing distance between the scanned area and said detector means, and
   means for maintaining a radiant energy surface at a predetermined temperature to produce a calibration signal to said detector when said convergent mirror means receives radiant energy from said predetermined temperature surface.

2. A scanning camera as set forth in claim 1 wherein said detector is responsive to radiant energy in the infrared region.

3. A scanning camera as set forth in claim 2 wherein said detector is a mercury-cadmium-telluride detector.

4. A scanning camera as set forth in claim 1 wherein said spherical lens are germanium.

5. A scanning camera, comprising:
   a hexagon-shaped supporting structure supporting mirrored surfaces on the side thereof mounted for rotation about two orthogonal axes,
   a motor for rotating said supporting structure about one of said orthogonal axes,
   a cam and cam follower for imparting a tailored motion to said supporting structure about the second orthogonal axes,
   an infrared detector responsive to infrared radiant energy incident on at least one of said mirrored surfaces and producing an output signal that varies with the infrared energy incident thereon,
   a hyperbolic mirror positioned to receive radiant energy from at least one of said mirrored surfaces and direct it to said infrared detector,
   an optical system, including two germanium spherical lenses, interposed between said hyperbolic mirror and said infrared detector for focusing the infrared radiant energy on said detector,
   support and adjustment means, including at least one track, for said hyperbolic mirror to move said mirror along said at least one track to vary the focusing distance between the scanned area and said infrared detector, and
   at least one constant temperature source, including a heater and source of electrical energy, to produce a calibration signal to said infrared detector when said hyperbolic mirror receives infrared energy from said constant temperature source.

* * * * *